(12) United States Patent
Abhari et al.

(10) Patent No.: US 8,653,199 B2
(45) Date of Patent: *Feb. 18, 2014

(54) FUNCTIONALIZED OLEFIN POLYMERS

(75) Inventors: Ramin Abhari, Bixby, OK (US);
Charles Lewis Sims, Houston, TX (US);
Mun Fu Tse, Seabrook, TX (US);
Patrick Brant, Seabrook, TX (US);
Peijun Jiang, League City, TX (US);
David Raymond Johnsrud, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,288

(22) Filed: Jun. 15, 2012

(65) Prior Publication Data
US 2013/0150531 A1    Jun. 13, 2013

Related U.S. Application Data

(63) Continuation of application No. 12/371,273, filed on Feb. 13, 2009, now Pat. No. 8,222,345, which is a continuation of application No. 10/825,349, filed on Apr. 15, 2004, now Pat. No. 7,550,528, which is a continuation-in-part of application No. 10/686,951, filed on Oct. 15, 2003, now Pat. No. 7,524,910, said application No. 12/371,273 is a continuation-in-part of application No. 10/687,508, filed on Oct. 15, 2003, now Pat. No. 7,294,681.

(60) Provisional application No. 60/418,482, filed on Oct. 15, 2002, provisional application No. 60/460,714, filed on Apr. 4, 2003.

(51) Int. Cl.
*C08L 23/10* (2006.01)
*C08L 23/12* (2006.01)
*C08L 23/14* (2006.01)

(52) U.S. Cl.
USPC ............. 525/240; 525/416; 525/70; 525/386

(58) Field of Classification Search
USPC .................... 525/240, 416, 70, 386
See application file for complete search history.

(56) References Cited

U.S. PATENT DOCUMENTS

| | | | |
|---|---|---|---|
| 5,455,111 A | 10/1995 | Velasquez | |
| 6,627,723 B2 | 9/2003 | Karandinos et al. | |
| 6,747,114 B2 * | 6/2004 | Karandinos et al. | 526/348.2 |
| 7,294,681 B2 * | 11/2007 | Jiang et al. | 526/348.2 |
| 7,524,910 B2 * | 4/2009 | Jiang et al. | 526/348 |
| 7,700,707 B2 * | 4/2010 | Abhari et al. | 526/348 |
| 8,193,289 B2 * | 6/2012 | Abhari et al. | 526/348 |
| 8,222,345 B2 * | 7/2012 | Abhari et al. | 525/240 |
| 2004/0054086 A1 | 3/2004 | Schauder et al. | |

FOREIGN PATENT DOCUMENTS

| | | |
|---|---|---|
| WO | WO 96/23838 | 8/1996 |
| WO | WO 98/10016 | 3/1998 |
| WO | WO 01/42351 | 6/2001 |
| WO | WO 02/051931 | 7/2002 |

* cited by examiner

*Primary Examiner* — Rip A. Lee

(57) ABSTRACT

This invention relates to a composition comprising a functionalized C3 to C40 olefin polymer comprising at least 50 mol % of one or more C3 to C40 olefins, and where the olefin polymer, prior to functionalization, has:
a Dot T-Peel of 1 Newton or more on Kraft paper;
an Mw of 10,000 to 100,000; and
a branching index (g') of 0.98 or less measured at the Mz of the polymer
when the polymer has an Mw of 10,000 to 60,000, or
a branching index of 0.95 or less measured at the Mz of the polymer when the polymer has an Mw of 10,000 to 100,000; and where the C3 to C40 olefin polymer comprises at least 0.001 wt % of a functional group. This invention further relates to blends of such functionalized polymers with other polymers including non-functionalized C3 to C40 olefin polymers as described above.

11 Claims, No Drawings

FUNCTIONALIZED OLEFIN POLYMERS

CROSS-REFERENCE TO RELATED APPLICATIONS

This application is a continuation of U.S. Ser. No. 12/371,273 filed Feb. 13, 2009, now U.S. Pat. No. 8,222,345, which is a continuation of U.S. Ser. No. 10/825,349 filed Apr. 15, 2004, now U.S. Pat. No. 7,550,128, which is a continuation-in-part of U.S. Ser. No. 10/686,951 filed Oct. 15,2003, now U.S. Pat. No. 7,524,910. Priority is claimed from U.S. Ser. No. 60/418,482, filed Oct. 15, 2002 and U.S. Ser. No. 60/460,714, filed Apr. 4, 2003. U.S. Ser. No. 12/371,273 is also a continuation-in-part of U.S. Ser. No. 10/687,508 filed Oct. 15, 2003, now U.S. Pat. No. 7,294,681 which claims priority from U.S. Ser. No. 60/418,482, filed Oct. 15, 2002 and U.S. Ser. No. 60/460,714, filed Apr. 4, 2003.

FIELD OF THE INVENTION

This invention relates to a composition comprising a functionalized C3-C40 olefin polymer. This invention further relates to functionalized olefin polymers, as well as processes to produce and use functionalized olefin polymers including applications as adhesives, tie layers, primers, compatibility agents, and the like.

BACKGROUND OF THE INVENTION

Olefin based polymers are widely used in various applications due to their being chemically inert, having low density, and low cost. Applications include adhesives, tie layers, films, fibers, and combinations thereof.

Olefin based polymers may be formed into various films, which may be laminated to, coated on, or co-extruded with various substrates. The film and the substrate may be combined with other materials to form a structure having a plurality of layers, each layer having a specific purpose. Packaging laminates, for example, may comprise a plurality of layers, such as a configurationally rigid core layer of paper or paperboard, an outer liquid-tight layer, an oxygen gas barrier such as a mid-layer of aluminum foil, and/or other layers depending on application needs.

To provide effective adhesion, it is important that good bonding strength or intimate integrity between the layers be achieved for most applications. However, relatively non-polar olefin based polymers do not normally adhere well to substrates which are more polar.

In addition, the set time of an adhesive may need to be within limits consistent with a proposed end use. Tailoring of an adhesive set time however may be accomplished at the expense of other attributes of an adhesive. For example, while inclusion of various forms of wax (e.g., polyethylene wax) may reduce a set time of an adhesive, the inclusion of a wax may also reduce or destroy adhesive properties in particular temperature ranges, and/or to particular substrates, especially polar substrates.

Adhesives are typically not heat stable, especially with respect to color over a period of time when the adhesive is heated at or above its melting point. Stability issues related to thermal degradation, including those related to bond strength and color body formation at elevated temperatures, may render various adhesives unfit for a variety of end uses.

There thus remains a need for an adhesive that will intimately bond to both polar and non-polar substrates, preferably one that exhibits a superior durability of bond strength under various temperature conditions at particular set times and in the presence of aggressive products, and that is heat stable at elevated temperatures.

SUMMARY OF THE INVENTION

This invention relates to a composition comprising a functionalized C3 to C40 olefin polymer comprising at least 50 mol % of one or more C3 to C40 olefins and having: a) a Dot T-Peel of 1 Newton or more on Kraft paper; b) an Mw of 10,000 to 100,000; and c) a branching index (g') of 0.98 or less measured at the Mz of the polymer when the polymer has an Mw of 10,000 to 60,000, or a branching index (g') of 0.95 or less measured at the Mz of the polymer when the polymer has an Mw of 10,000 to 100,000. This invention further relates to such functionalized C3 to C40 olefin polymers blended with other polymers. In a preferred embodiment the functionalized C3 to C40 olefin polymer is blended with the same or different non-functionalized C3 to C40 olefin polymer comprising at least 50 mol % of one or more C3 to C40 olefins and having: a) a Dot T-Peel of 1 Newton or more on Kraft paper; b) an Mw of 10,000 to 100,000; and c) a branching index (g') of 0.98 or less measured at the Mz of the polymer when the polymer has an Mw of 10,000 to 60,000, or a branching index (g') of 0.95 or less measured at the Mz of the polymer when the polymer has an Mw of 10,000 to 100,000.

By "functionalized C3 to C40 olefin polymer" is meant that the C3 to C40 olefin polymer is contacted with a functional group, and optionally a catalyst, heat, initiator, or free radical source to cause all or part of the functional group to incorporate, graft, bond to, physically attach to, and or chemically attach to the C3 to C40 olefin polymer. By "functional group" is meant any compound with a weight average molecular weight of 1000 or less that contains a heteroatom and or an unsaturation. Preferably the functional group is a compound containing a heteroatom, such as maleic anhydride. Preferred functional groups include organic acids, organic amides, organic amines, organic esters, organic anhydrides, organic alcohols, organic acid halides (such as acid chlorides, acid bromides, etc.) organic peroxides, and the like.

For ease of reference the functionalized C3 to C40 olefin polymer may be abbreviated as F-POA and a C3 to C40 olefin polymer that has NOT been functionalized may be referred to as a POA.

DETAILED DESCRIPTION

For the purposes of this invention and the claims thereto and for ease of reference, when a polymer is referred to as comprising an olefin, the olefin present in the polymer is the polymerized form of the olefin.

In a preferred embodiment, this invention relates to a composition comprising:

1) 0.5 to 99 weight % (preferably 1 to 75 weight %, more preferably 1.5 to 40 weight %, preferably 2 to 20 weight %, preferably 2.5 to 10 weight %) of a functionalized C3 to C40 olefin polymer comprising at least 50 mol % of one or more C3 to C40 olefins and having: a) a Dot T-Peel of 1 Newton or more on Kraft paper; b) an Mw of 10,000 to 100,000; and c) a branching index (g') of 0.98 or less measured at the Mz of the polymer when the polymer has an Mw of 10,000 to 60,000, or a branching index (g') of 0.95 or less measured at the Mz of the polymer when the polymer has an Mw of 10,000 to 100,000.

2) 99 to 1 weight % (preferably 99 to 25 weight %, more preferably 98.5 to 60 weight %, preferably 98 to 80 weight %, preferably 97.5 to 90 weight %) of one or more additional polymers different from the functionalized C3 to C40 olefin polymer, based upon the weight of the additional polymer(s) and the functionalized C3 to C40 olefin polymer.

In a preferred embodiment the additional polymer comprises one or more C3 to C40 olefin polymer comprising at least 50 mol % of one or more C3 to C40 olefins and having: a) a Dot T-Peel of 1 Newton or more on Kraft paper; b) an Mw of 10,000 to 100,000; and c) a branching index (g') of 0.98 or less measured at the Mz of the polymer when the polymer has an Mw of 10,000 to 60,000, or a branching index (g') of 0.95 or less measured at the Mz of the polymer when the polymer has an Mw of 10,000 to 100,000.

In a preferred embodiment this invention relates to a blend comprising F-POA and between 1 and 90 weight % tackifier, preferably between 5 and 75 weight %, more preferably between 10 and 60 weight %, more preferably between 15 and 50% of tackifier, based upon the weight of the blend, and between 10 and 99 weight % of the F-POA, preferably between 95 and 25 weight %, more preferably between 40 and 90 weight %, more preferably between 85 and 50% of the F-POA.

In another preferred embodiment this invention relates to a blend comprising F-POA, POA and between 1 and 90 weight % tackifier, preferably between 5 and 75 weight %, more preferably between 10 and 60 weight %, more preferably between 15 and 50% of tackifier, based upon the weight of the blend, and between 10 and 99 weight % of F-POA and POA, preferably between 95 and 25 weight %, more preferably between 40 and 90 weight %, more preferably between 85 and 50%.

In a preferred embodiment comprising POA and F-POA, the POA and the F-POA may include the same olefin polymer or blend of olefin polymers which is/are functionalized to become the F-POA, which are then blended with POA. In another embodiment, the olefin polymer or blend of olefin polymers of the POA may be different from the olefin polymer or blend of olefin polymers functionalized to become the F-POA. In still another embodiment, the olefin polymer or blend of olefin polymers of the POA may be the exact same olefin polymer or blend of olefin polymers that has been functionalized to become the F-POA. In yet another embodiment, the F-POA may include functionalized analogs of the exact same olefin polymer or blend of olefin polymers as is in the POA. Preferably, the POA comprises the exact same olefin polymer as the F-POA, which has been functionalized with maleic anhydride.

C3 to C40 Olefin Polymers (POA's)

Preferred C3 to C40 olefin polymers (also called "POA's" or "POA polymers") useful in this invention are those described in U.S. Ser. No. 10/686,951, filed Oct. 15, 2003 and U.S. Ser. No. 10/687,508, filed Oct. 15, 2003, which are incorporated by reference herein. In particular, pages 23 to 91 of U.S. Ser. No. 10/686,951 and pages 22 to 168 of U.S. Ser. No. 10/687,508 provide specific instruction on how to produce the C3 to C40 olefin polymers useful herein. In general preferred POA's comprise a polypropylene prepared utilizing two or more catalysts (typically metallocene catalysts), wherein one catalyst is selected as being capable of producing essentially atactic polypropylene (aPP), and the other metallocene catalyst is selected as being capable of producing isotactic polypropylene (iPP) under the polymerization conditions utilized. Preferably, under the polymerization conditions utilized, incorporation of aPP and iPP polymer chains may occur within the in-reactor blend such that an amount of amorphous polypropylene present in the POA polymer is grafted to isotactic polypropylene, represented herein as (aPP-g-IPP) and/or such that an amount of isotactic polypropylene present in the POA polymer is grafted to amorphous polypropylene, represented herein as (iPP-g-aPP).

Preferred POA's useful in this invention include olefin polymer comprising one or more $C_3$ to $C_{40}$ olefins, preferably propylene, and less than 50 mole % of ethylene, having:
  a) a Dot T-Peel between 1 Newton and the 10,000 Newtons; and
  b) a Mz/Mn of 2 to 200; and/or
  c) an Mw of X and a g' of Y (measured at the Mz of the polymer) according to the following Table 1:

TABLE 1

| X (Mw) | Y (g') |
|---|---|
| 100,000 or less, preferably 80,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments X is also at least 7000, more preferably 10,000, more preferably at least 15,000. | 0.9 or less, preferably 0.7 or less; preferably between 0.5-0.9 |
| 75,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at 7000, more preferably 10,000, more preferably at least 15,000. | 0.92 or less, preferably, 0.6 or less; preferably between 0.4-0.6- |
| 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.95 or less, preferably 0.7 or less; preferably between 0.5-0.7- |
| 30,000 or less, preferably 25,000 or less, more preferably 20,000 or less, more preferably 15,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.98 or less preferably between 0.7-0.98 |

Preferred POA's useful in this invention include olefin polymers comprising one or more $C_3$ to $C_{40}$ olefins, preferably propylene, and less than 50 mole % of ethylene, having:
  a) a Dot T-Peel between 1 Newton and 10,000 Newtons; and
  b) a Mz/Mn of 2 to 200; and
  c) an Mw between 15,000 and 100,000; and
  d) a g'<($10^{-12}$ Mw$^2$–$10^{-6}$ Mw+1.0178).

In an embodiment, the g' may be 0.9 or less, 0.8 or less, 0.7 or less, 0.6 or less, 0.5 or less when measured at the Mz of the polymer.

In another embodiment the POA may have a peak melting point (Tm) between 40 and 250° C., or between 60 and 190° C., or between 60 and 150° C., or between 80 and 130° C. In some embodiments the peak melting point is between 60 and 160° C. In other embodiments the peak melting point is between 124-140° C. In other embodiments, the peak melting temperature is between 40-130° C.

In another embodiment the POA may have a viscosity (also referred to a Brookfield Viscosity or Melt Viscosity) of 90,000 mPa·sec or less at 190° C. (as measured by ASTM D 3236 at 190° C.); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, and/or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec. In other embodiments the viscosity is 200,000 mPa·sec or less at 190° C., depending on the application. In other embodiments the olefin polymer may have a viscosity of about 50,000 mPa·sec or less, depending on the application.

In another embodiment the POA may also have a heat of fusion of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 20 and 50 J/g.

In another embodiment the oPOA may also have a Shore A Hardness (as measured by ASTM2240) of 95 or less, 70 or less, or 60 or less, or 50 or less, or 40 or less or 30 or less, or 20 or less. In other embodiments, the Shore A Hardness may be 5 or more, 10 or more, or 15 or more. In certain applications, such as packaging, the Shore A Hardness is preferably about 60-70.

In still another embodiment the POA may have a Mz/Mn of 2 to 200, preferably 2 to 150, preferably 10 to 100.

In another embodiment the POA may have a Shear Adhesion Fail Temperature (SAFT—as measured by ASTM4498) of 200° C. or less, or of 40° C. to 150° C., or 60° C. to 130° C., or 65° C. to 110° C., or 70° C. to 80° C. In certain embodiments SAFT's of 130° C. to 140° C. may be preferred.

In another embodiment the POA may have a Dot T-Peel of between 1 Newton and 10,000 Newtons, or 3 and 4000 Newtons, or between 5 and 3000 Newtons, or between 10 and 2000 Newtons, or between 15 and 1000 Newtons. As used herein, Dot T-Peel is determined according to ASTM D 1876, except that the specimen is produced by combining two 1 inch by 3 inch (2.54 cm×7.62 cm) Kraft paper substrate cut outs with a dot of adhesive with a volume that, when compressed under a 500 gram weight occupies about 1 square inch of area (1 inch=2.54 cm). Once made all the specimens are pulled apart in side by side testing (at a rate of 2 inches per minute) by a device which records the destructive force of the insult being applied. The maximum force achieved for each sample tested was recorded and averaged, thus producing the Average Maximum Force which is reported as the Dot T-Peel.

In another embodiment the POA may have a set time of several days to about 0.1 seconds or less, or 60 seconds or less, or 30 seconds or less, or 20 seconds or less, or 15 seconds or less, or 10 seconds or less, or 5 seconds or less, or 4 seconds or less, or 3 seconds or less, or 2 seconds or less, or 1 second or less.

In another embodiment the POA may have a Mw/Mn of 2 to 75, or 4 to 60, or 5 to 50, or 6 to 20.

In yet another embodiment, the POA may have an Mz of 1,000,000 or less, preferably 15,000 to 1,000,000, or 20,000 to 800,000, or 25,000 to 350,000.

In another embodiment the POA may also have a strain at break (as measured by ASTM D-1708 at 25° C.) of 50 to 1000%, preferably 80 to 200%. In some other embodiments the strain at break is 100 to 500%.

In another embodiment, the POA has a tensile strength at break (as measured by ASTM D-1708 at 25° C.) of 0.5 MPa or more, alternatively 0.75 MPa or more, alternatively 1.0 MPa or more, alternatively 1.5 MPa or more, alternatively 2.0 MPa or more, alternatively 2.5 MPa or more, alternatively 3.0 MPa or more, alternatively 3.5 MPa or more.

In another embodiment, the POA also has a crystallization point (Tc) between 20° C. and 110° C. In some embodiments the Tc is between 70° C. to 100° C. In other embodiments the Tc is between 30° C. and 80° C. In other embodiments the Tc is between 20° C. and 50° C.

In some embodiments the POA may have a slope of −0.1 or less, preferably −0.15 or less, more preferably −0.25 or less in the trace of complex viscosity versus temperature as shown in FIG. 1 (as measured by ARES dynamic mechanical spectrometer operating at a frequency of 10 rad/s, with a strain of 20% under a nitrogen atmosphere, and a cooling rate of 10° C./min) over the range of temperatures from Tc+10° C. to Tc+40° C. The slope is defined for use herein as a derivative of log(complex viscosity) with respect to temperature.

In another embodiment the POA has a Tc that is at least 10° C. below the Tm, preferably at least 20° C. below the Tm, preferably at least 30° C. below the Tm, more preferably at least 35° C. below the Tm.

In another embodiment some POA's described above may have a melt index ratio ($I_{10}/I_2$) of 6.5 or less, preferably 6.0 or less, preferably 5.5 or less, preferably 5.0 or less, preferably 4.5 or less, preferably between 1 and 6.0. ($I_{10}$ and $I_2$ are measured according to ASTM1238 D, 2.16 kg, 190° C.).

In another embodiment some POA's described above may have a melt index (as determined by ASTM1238 D, 2.16 kg, 190° C.) of 25 dg/min or more, preferably 50 dg/min or more, preferably 100 dg/min or more, more preferably 200 dg/min or more, more preferably 500 dg/mn or more, more preferably 2000 dg/min or more. In another embodiment the POA has a melt index of 900 dg/min or more.

In another embodiment the POA may have a range of crystallization of 10 to 60° C. wide, preferably 20 to 50° C., preferably 30 to 45° C. in the DSC traces. In DSC traces where there are two or more non-overlapping peaks, then each peak has a range of crystallization of 10 to 60° C. wide, preferably 20 to 50° C., preferably 30 to 45° C. in the DSC traces.

In another embodiment the POA may have a molecular weight distribution (Mw/Mn) of at least 2, preferably at least 5, preferably at least 10, even more preferably at least 20.

In another embodiment the POA may have a unimodal, bimodal, or multimodal molecular weight distribution (Mw/Mn) distribution of polymer species as determined by Size Exclusion Chromatography (SEC). By bimodal or multimodal is meant that the SEC trace has more than one peak or inflection points. An inflection point is that point where the second derivative of the curve changes in sign (e.g., from negative to positive or vice versus).

In another embodiment the POA may have an energy of activation of 8 to 15 cal/mol. Energy of activation being calculated using the relationships of complex viscosity and temperature over the region where thermal effects are responsible for viscosity increase (assuming an Arrhenius-like relationship).

In another embodiment the POA's utilized in this invention may have a crystallinity of at least 5%.

In another embodiment the POA's described above may also have one or more of the following:
    a) a peak melting point between 60 and 190° C., or between about 60 and 150° C., or between 80 and 130° C.; and/or
    b) a viscosity of 8000 mPa·sec or less at 190° C. (as measured by ASTM D 3236 at 190° C.); or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec; and/or c) an $H_f$ (Heat of fusion) of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 20 and 50 J/g; and or d) a Shore A Hardness (as measured by ASTM2240) of 90 or less, or 80 or less, or 70 or less, or 60 or less or 50 or less, or 40 or less; and or e) a Shear Adhesion Fail Temperature (SAFT—as measured by ASTM4498) of 40 to 150° C., or 60 to 130° C., or 65 to 110° C., or 70-80° C.; and or;

f) a Dot T-Peel of between 1 Newton and 10,000 Newtons, or 3 and 4000 Newtons, or between 5 and 3000 Newtons, or between 10 and 2000 Newtons, or between 15 and 1000 Newtons; and/or g) a set time of several days to 0.1 second, or 60 seconds or less, or 30 seconds or less, or 20 seconds or less, or 15 seconds or less, or 10 seconds or less, or 5 seconds or less, or 4 seconds or less, or 3 seconds or less, more or 2 seconds or less, or 1 second or less; and or h) an Mw/Mn of greater than 1 to 75, or 2 to 60, or 2 to 50, or 3 to 20; and/or i) an Mz of 1,000,000 or less, preferably 15,000 to 500,000, or 20,000 to 400,000, or 25,000 to 350,000.

Useful combinations of features include POA's having a Dot T-Peel of between 1 Newton and 10,000 Newtons, or 3 and 4000 Newtons, or between 5 and 3000 Newtons, or between 10 and 2000 Newtons, or between 15 and 1000 Newtons and:

1. an Mw of 30,000 or less, a peak melting point between 60 and 190° C., a Heat of fusion of 1 to 70 J/g, a branching index (g') of 0.90 or less measured at the Mz of the polymer; and a melt viscosity of 8000 mPa·sec or less at 190° C.; or 2. an Mz of 20,000 to 500,000 and a SAFT of 60 to 150° C.; or 3. an Mz/Mn of 2-200 and a set time of 2 seconds or less; or 4. an $H_f$ (heat of fusion) of 20 to 50 J/g, an Mz or 20,000-500,000 and a shore hardness of 50 or less; or 5. an Mw/Mn of greater than 1 to 50, a viscosity of 5000 or less mPa·sec at 190° C.; or 6. an Mw of 50,000 or less, a peak melting point between 60 and 190° C., a heat of fusion of 2 to 70 J/g, a branching index (g') of 0.70 or less measured at the Mz of the polymer, and a melt viscosity of 8000 mPa·sec or less at 190° C.

In a preferred embodiment, the POA comprises amorphous, crystalline and branch-block molecular structures.

In a preferred embodiment the POA comprises at least 50 weight % propylene, preferably at least 60% propylene, alternatively at least 70% propylene, alternatively at least 80% propylene. In another embodiment the POA comprises propylene and 15 mole % ethylene or less, preferably 10 mole % ethylene or less, more preferably 9 mole % ethylene or less, more preferably 8 mole % ethylene or less, more preferably 7 mole % ethylene or less, more preferably 6 mole % ethylene or less, more preferably 5 mole % ethylene or less, more preferably 4 mole % ethylene or less, more preferably 3 mole % ethylene or less, more preferably 2 mole % ethylene or less, more preferably 1 mole % ethylene or less.

In another embodiment the POA comprises less than 5 mole % of ethylene, preferably less than 4.5 mole % ethylene, preferably less than 4.0 mole % ethylene, alternatively less than 3.5 mole % ethylene, alternatively less than 3.0 mole % ethylene, alternatively less than 2.5 mole % ethylene, alternatively less than 2.0 mole % ethylene, alternatively less than 1.5 mole % ethylene, alternatively less than 1.0 mole % ethylene, alternatively less than 0.5 mole % ethylene, alternatively less than 0.25 mole % ethylene, alternatively 0 mole % ethylene.

In another embodiment the POA has a glass transition temperature (Tg) as measured by ASTM E 1356 of 5° C. or less, preferably 0° C. or less, preferably −5° C. or less, alternatively between −5° C. and −40° C., alternatively between −5° C. and −15° C.

In another embodiment the POA has an amorphous content of at least 50%, alternatively at least 60%, alternatively at least 70%, even alternatively between 50 and 99%. Percent amorphous content is determined using Differential Scanning calorimetry measurement according to ASTM E 794-85.

In another embodiment the POA has a crystallinity of 40% or less, alternatively 30% or less, alternatively 20% or less, even alternatively between 10% and 30%. Percent crystallinity content is determined using Differential Scanning calorimetry measurement according to ASTM E 794-85. In another embodiment, the POA's described herein have a percent crystallinity of between 5 and 40%, alternatively between 10 to 30%.

In another embodiment the POA may have a molecular weight distribution (Mw/Mn) of at least 1.5, preferably at least 2, preferably at least 5, preferably at least 10, even alternatively at least 20. In other embodiments the Mw/Mn is 20 or less, 10 or less, even 5 or less. Molecular weight distribution generally depends on the catalysts used and process conditions such as temperature, monomer concentration, catalyst ratio, if multiple catalysts are used, and the presence or absence of hydrogen. Hydrogen may be used at amounts up to 2 weight %, but is preferably used at levels of 50 to 500 ppm.

In another embodiment the POA may be found to have at least two molecular weights fractions present at greater than 2 weight %, preferably greater than 20 weight %, each based upon the weight of the polymer as measured by Gel Permeation Chromatography. The fractions can be identified on the GPC trace by observing two distinct populations of molecular weights. An example would be a GPC trace showing a peak at 20,000 Mw and another peak at 50,000 Mw where the area under the first peak represents more than 2 weight % of the polymer and the area under the second peak represents more than 2 weight % of the polymer.

In another embodiment the POA of this invention may have 20 weight % or more (based upon the weight of the starting polymer) of hexane room temperature soluble fraction, and 70 weight % or less, preferably 50 weight % or less of Soxhlet boiling heptane insolubles, based upon the weight of the polymer. Soxhlet heptane insoluble refers to one of the fractions obtained when a sample is fractionated using successive solvent extraction technique. The fractionations are carried out in two steps: one involves room temperature solvent extraction, the other soxhlet extraction. In the room temperature solvent extraction, about one gram of polymer is dissolved in 50 ml of solvent (e.g., hexane) to isolate the amorphous or very low molecular weight polymer species. The mixture is stirred at room temperature for about 12 hours. The soluble fraction is separated from the insoluble material using filtration under vacuum. The insoluble material is then subjected to a Soxhlet extraction procedure. This involves the separation of polymer fractions based on their solubility in various solvents having boiling points from just above room temperature to 110° C. The insoluble material from the room temperature solvent extraction is first extracted overnight with a solvent such as hexane and heptane (Soxhlet); the extracted material is recovered by evaporating the solvent and weighing the residue. The insoluble sample is then extracted with a solvent having higher boiling temperature such as heptane and after solvent evaporation, it is weighed. The insolubles and the thimble from the final stage are air-dried in a hood to evaporate most of the solvent, then dried in a nitrogen-purged vacuum oven. The amount of insoluble left in the thimble is then calculated, provided the tare weight of the thimble is known.

In another embodiment, the POA's may have a heptane insoluble fraction 70 weight % or less, based upon the weight of the starting polymer, and the heptane insoluble fraction has branching index g' of 0.9 (preferably 0.7) or less as measured at the Mz of the polymer. In a preferred embodiment the composition may also have at least 20 weight % hexane soluble fraction, based upon the weight of the starting polymer. In another embodiment, the POA's may have a heptane insoluble fraction 70 weight % or less, based upon the weight of the starting polymer and a Mz between 20,000 and 5000,000 of the heptane insoluble portion. In a preferred embodiment the composition also has at least 20 weight % hexane soluble fraction, based upon the weight of the starting polymer. In another embodiment the POA's have a hexane soluble portion of at least 20 weight %, based upon the weight of the starting polymer.

In another embodiment the POA comprises propylene and 15 mole % ethylene or less, preferably 10 mole % ethylene or less, more preferably 9 mole % ethylene or less, more preferably 8 mole % ethylene or less, more preferably 7 mole % ethylene or less, more preferably 6 mole % ethylene or less, more preferably 5 mole % ethylene or less, more preferably 4 mole % ethylene or less, more preferably 3 mole % ethylene or less, more preferably 2 mole % ethylene or less, more preferably 1 mole % ethylene or less.

In another embodiment the POA comprises less than 5 mole % of ethylene, preferably less than 4.5 mole % ethylene, preferably less than 4.0 mole % ethylene, alternatively less than 3.5 mole % ethylene, alternatively less than 3.0 mole % ethylene, alternatively less than 2.5 mole % ethylene, alternatively less than 2.0 mole % ethylene, alternatively less than 1.5 mole % ethylene, alternatively less than 1.0 mole % ethylene, alternatively less than 0.5 mole % ethylene, alternatively less than 0.25 mole % ethylene, alternatively 0 mole % ethylene.

For ease of reference the portion of the olefin polymer produced by one of the catalyst may have at least 10% crystallinity may also be referred to as the "semi-crystalline polymer" and the polymer produced by another of the catalyst may have a crystallinity of less than 5%, which may be referred to as the "amorphous polymer."

In another embodiment of this invention the POA may have a characteristic three-zone complex viscosity-temperature pattern, consistent with that shown in FIG. 1. The temperature dependence of complex viscosity was measured using ARES dynamic mechanical spectrometer operating at a frequency of 10 rad/s, with a strain of 20% under a nitrogen atmosphere, and a cooling rate of 10° C./min. The sample was first molten then gradually cooled down to room temperature while monitoring the build-up in complex viscosity. Above the melting point, which is typical of polymer processing temperature, the complex viscosity is relatively low (Zone I) and increases gradually with decreasing temperature. In zone II, a sharp increase in complex viscosity appears as temperature is dropped. The third zone (Zone III) is the high complex viscosity zone, which appears at lower temperatures corresponding to application (end use) temperatures. In Zone III the complex viscosity is high and varies slightly with further decrease in temperature. Such a complex viscosity profile provides, in hot melt adhesive applications, a desirable combination of long opening time at processing temperatures and fast set time at lower temperatures.

In a preferred embodiment, the POA's have less than 1 mol % ethylene, have at least 2 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 5 mol % as measured by Carbon 13 NMR as described below.

In an another embodiment, the POA's may have between 1 and 10 mol % ethylene, have at least 2+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

In a preferred embodiment, the POA's may have less than 1 mol % ethylene, have an amorphous component (i.e., defined to be that portion of the polymer composition that has a crystallinity of less than 5%) which contains at least 3 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 20 mol % as measured by Carbon 13 NMR as described below.

In an another embodiment, the POA's may have between 1 and 10 mol % ethylene, have an amorphous component (which is defined to be that portion of the polymer composition that has a crystallinity of less than 5%) which contains at least 3+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

Functionalized C3-C40 Olefin Polymers (F-POA's)

Any of the polymers described above as POA's may be functionalized and used as F—POA's. Typically, the POA is combined with a free radical initiator and a grafting monomer or other functional group (such as maleic acid or maleic anhydride) and is heated to react the monomer with the POA to form the F-POA.

As stated above, the present invention comprises a functionalized olefin polymer or blend of functionalized olefin polymers, also referred to herein as grafted olefin polymers. By functionalized (or grafted) it is meant that various functional groups are incorporated, grafted, bonded to, and/or physically or chemically attached to the polymer backbone of the POA being functionalized.

In one embodiment, functional groups are grafted onto the POA utilizing radical copolymerization of an functional group, referred to herein as graft copolymerization.

Examples of suitable functional groups include unsaturated carboxylic acids, esters of the unsaturated carboxylic acids, acid anhydrides, di-esters, salts, amides, imides, aromatic vinyl compounds hydrolyzable unsaturated silane compounds and unsaturated halogenated hydrocarbons. Preferred examples of unsaturated carboxylic acids and acid derivatives include, but are not limited to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&g, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Examples of the esters of the unsaturated carboxylic acids include methyl acrylate, ethyl acrylate, butyl acrylate, methyl methacrylate, ethyl methacrylate and butyl methacrylate.

Hydrolyzable unsaturated silane compounds useful as functional groups herein may include radical polymerizable unsaturated group and an alkoxysilyl group or a silyl group in its molecule, such that the compound has a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid or the like. Examples thereof include vinyltrichlorosilane, vinyltris (beta-methoxyethoxy)silane, vinyltriethoxysilane, vinyltrimethoxysilane, gamma-methacryloxypropyltrimethoxysilane monovinylsilane and monoallylsilane.

Examples of unsaturated halogenated hydrocarbons useful as functional groups herein include vinyl chloride and vinylidene chloride.

In a preferred embodiment, the POA is grafted with maleic anhydride (MA), to produce olefin grafted maleic anhydride (POA-g-MA), wherein the maleic anhydride is bonded to the polymer chain of the polymeric composition.

Preferable examples of the radical initiator used in the graft copolymerization include organic peroxides such as benzoyl peroxide, methyl ethyl ketone peroxide, cyclohexanone peroxide, t-butylperoxyisopropyl carbonate, di-ti-butyl perphthalate, 2,5-dimethyl-2,5-di(t-butylperoxy)hexene, 2,5-dimethyl-2,5-di(t-butylperoxy)hexene-3, di-t-butyl peroxide, cumene hydroperoxide, t-butyl hydroperoxide, dilauryl peroxide and dicumyl peroxide.

The F-POA of the present invention may thus be obtained by heating the POA(s) and the functional group(s) in the presence of the radical initiator at, near, or above a decomposition temperature of the radical initiator.

In some embodiments, no particular restriction need be put on the amount of the functional group to be used, accordingly, conventional conditions for functionalizing, for example, an isotactic polypropylene, can be utilized with the POA's of this invention. Since in some cases the efficiency of the copolymerization is relatively high, the amount of the functional group may be small. In an embodiment, the amount of the functional group to be incorporated into the POA is preferably from about 0.001 to 50 wt % functional group with respect to the total amount of olefin polymer present, preferably from 0.005 to 40 weight %, preferably from 0.01 to 35 weight %, preferably from about 0.05 to about 30 weight %, more preferably from about 0.1 to about 25 weight %, preferably from about 0.5 to about 20 weight %, preferably from about 1.0 to about 15 weight %, preferably from about 1.5 to 10 weight %, preferably from about 2 to 5 weight %, preferably from about 2 to about 4 weight %. In a preferred embodiment, the amount of the maleic acid and/or maleic anhydride, preferably maleic anhydride, to be incorporated into the POA is preferably from about 0.001 to about 50 wt %, based upon the weight of the POA, preferably from 0.005 to 40 weight %, preferably from 0.01 to 35 weight %, preferably from about 0.05 to about 30 weight %, more preferably from about 0.1 to about 25 weight %, preferably from about 0.5 to about 20 weight %, preferably from about 1.0 to about 15 weight %, preferably from about 1.5 to 10 weight %, preferably from about 2 to 5 weight %, preferably from about 2 to about 4 weight %.

The radical initiator is preferably used in a ratio of from 0.00001 to 10 wt %, based on the weight of the functional group. The heating temperature depends upon whether or not the reaction is carried out in the presence of a solvent, but it is usually from about 50° C. to 350° C. When the heating temperature is less than 50° C., the reaction may be slow and thus efficiency may be low. When it is more than 350° C., decomposition of the POA may occur.

The F-POA may be functionalized with an functional group utilizing a solvent based functionalization process and/or utilizing a melt based functionalization process without a solvent. In the solvent based process, the reaction may be carried out using the POA in the form of a solution or a slurry having a concentration of from 0.1 to 50 wt % in the presence of a halogenated hydrocarbon compound having 2 to 20 carbon atoms, an aromatic compound, a halogenated aromatic compound, an alkyl substituted aromatic hydrocarbon, a cyclic hydrocarbon, and/or a hydrocarbon compound having 6 to 20 carbon atoms which is stable to the radicals.

The POA may also be functionalized in a process utilizing a melt based functionalization process without a solvent. Such a reaction may be carried out in the absence of the solvent in a device such as an extruder which can sufficiently produce physical contact between the POA, and the unsaturated monomer. In the latter case, the reaction is usually effected at a relatively high temperature, as compared with the reaction in the state of the solution.

Other methods for functionalizing POA's that may be used include, but are not limited to, selective oxidation, ozonolysis, epoxidation, and the like, both in solution or slurry (i.e., with a solvent), or in a melt (i.e., without a solvent) as described above.

In the present invention, the graft polymerization (grafting of the POA) may also be carried out in an aqueous medium. In this case a dispersant can be used, and examples of the dispersant include a saponified polyvinyl acetate, modified celluloses such as hydroxyethyl cellulose and hydroxypropyl cellulose, and compounds containing an OH group such as polyacrylic acid and polymethacrylic acid. In addition, compounds which are used in a usual aqueous suspension polymerization can also be widely employed.

The reaction may be carried out by suspending the POA, the water-insoluble radical polymerizable monomer, the water-insoluble radical initiator and/or the dispersant in water, and then heating the mixture. Here, a ratio of water to the sum of the radical polymerizable monomer (i.e., the functional group) and the POA is preferably 1:0.1 to 1:200, more preferably 1:1 to 1:100. The heating temperature is such that the half-life of the radical initiator is preferably from 0.1 to 100 hours, more preferably from 0.2 to 10 hours, and it is preferably from 30° to 200° C., more preferably from 40° to 150° C. In the heating step, it is preferred that the mixture is stirred sufficiently so as to become in a suspension state. In this way, the F-PAO may be obtained in granular form.

A weight ratio of the water-insoluble monomer to the POA may preferably be from 1:01 to 1:10000, and a weight ratio of the radical initiator to the water-insoluble monomer may be from 0.00001 to 0.1. The ratio of the water-insoluble monomer in the F-POA depends upon its use, but the amount of the monomer may be from 0.1 to 200% by weight based on the weight of the POA present in the F-POA.

The F-POA preferably contains a desired amount of radical polymerizable functional group units in the range of from 0.1 to 50 wt % based on the weight of the POA in compliance with its intended use or application.

Furthermore, a compatibilizing effect within the inventive composition obtained by inclusion of the F-POA may be influenced by the level of grafting. In an embodiment, the POA may be functionalized to include about 0.001 wt % or greater of the functional group attached. The POA may also be functionalized grafted to a higher degree. The level of functionalization (e.g., the grafting level) may be less than about 50 wt %, preferably less than about 45 wt %, preferably less than about 40 wt %, preferably less than about 35 wt %, preferably less than about 30 wt %, preferably less than about 25 wt %, preferably less than about 20 wt %, preferably less than about 15 wt %, preferably less than about 10 wt %, preferably less than about 9 wt %, preferably less than about 8 wt %, preferably less than about 7 wt %, preferably less than about 6 wt %, preferably less than about 5 wt %, preferably less than about 4 wt %, preferably less than about 3 wt %, preferably less than about 2 wt %, preferably less than about 1.5 wt %, preferably less than about 1 wt %, preferably less than about 0.5 wt %.

The F-PAO may be a single POA which has been functionalized as described herein. In another embodiment, the F-POA of the present invention may be a blend of POA's which are functionalized together during a single process. The F-POA's of the present invention may also include a plurality of F-POA's which are combined after being individually functionalized, or any combination thereof.

In another aspect this invention provides the ability to produce adhesives that may be do not have to be further blended or modified.

Accordingly, this invention also further relates to a continuous process to prepare an F-PAO comprising the steps of:

1) combining monomer, optional solvent, catalyst and activator in a reactor system;
2) withdrawing PAO solution from the reactor system;
3) removing at least 10% solvent, if present, from the PAO solution;
4) quenching the reaction;
5) devolatilizing the PAO solution to form molten PAO;
6) combining at least a portion of the molten PAO with an functional group (preferably maleic anhydride) in the presence of a radical initiator at a temperature, and for a period of time sufficient to produce F-PAO;
7) combining F-PAO, optionally PAO, and optionally one or more additives (such as those described below) in a mixer, such as a static mixer, (in a preferred embodiment tackifer is not added or is added in amounts of less than 30 weight %, preferably less than 20 weight %, more preferably in amounts of less than 10 weight %), and mixing to produce the inventive compositon;
8) removing the composition from the mixer, and
9) pelletizing or drumming the composition;
where step 1) comprises any of the processes described herein for the production of PAO.

In another embodiment this invention relates to a continuous process to prepare an adhesive comprising:

1) combining monomer, optional solvent, catalyst and activator in a reactor system;
2) withdrawing PAO solution from the reactor system;
3) removing at least 10% solvent, if present, from the PAO solution;
4) quenching the reaction;
5) devolatilizing the PAO solution to form molten PAO;
6) combining at least a portion of the molten PAO with an functional group in the presence of a radical initiator for a period of time sufficient to graft the functional group into the PAO to produce F-PAO;
7) combining the molten F-PAO, the PAO, and one or more additives in a mixer, such as a static mixer;
8) removing the polymer combination from the mixer; and
9) pelletizing or drumming the polymer combination.

In a particularly preferred embodiment, this invention relates to a continuous process to make an adhesive comprising:

1) selecting a first catalyst component capable of producing a polymer having an Mw of 100,000 or less and a crystallinity of 20% or less (preferably 5% or less) under selected polymerization conditions;
2) selecting a second catalyst component capable of producing polymer having an Mw of 100,000 or less and a crystallinity of 20% or more (preferably 40% or more) at the selected polymerization conditions;
3) contacting, in a solvent and in a reaction zone under the selected polymerization conditions, the catalyst components in the presence of one or more activators with one or more C3 to C40 olefins, and, optionally one or more diolefins;
4) at a temperature of greater than 70° C., preferably greater than 100° C.;
5) at a residence time of up to 120 minutes, (preferably 60 minutes or less);
6) wherein the ratio of the first catalyst to the second catalyst is from 1:1 to 50:1; 7) wherein the activity of the catalyst components is at least 50 kilograms of polymer per gram of the catalyst components; and wherein at least 20% of the olefins are converted to polymer;
8) withdrawing olefin polymer solution from the reaction zone;
9) removing at least 10% solvent from the olefin polymer solution;
10) quenching the reaction;
11) devolatilizing the olefin polymer solution to form molten olefin polymer;
12) combining at least a portion of the molten olefin polymer with an functional group in the presence of a radical initiator at a temperature, and for a period of time sufficient to produce the functionalized olefin polymer (e.g., to graft the functional group into the olefin polymer);
13) combining the molten functionalized olefin polymer, the olefin polymer, and one or more additives in a mixer, such as a static mixer to produce the inventive composition;
14) removing the olefin polymer combination (the composition) from the mixer; and
15) pelletizing or drumming the composition.

In a particularly preferred embodiment, this invention relates to a continuous process to make an adhesive comprising:

1) selecting a first catalyst component capable of producing a polymer having an Mw of 100,000 or less and a crystallinity of 20% or less (preferably 5% or less) under selected polymerization conditions;
2) selecting a second catalyst component capable of producing polymer having an Mw of 100,000 or less and a crystallinity of 20% or more (preferably 40% or more) at the selected polymerization conditions;
3) contacting, in a solvent and in a reaction zone under the selected polymerization conditions, the catalyst components in the presence of one or more activators with one or more C3 to C40 olefins, and, optionally one or more diolefins;

4) at a temperature of greater than 70° C., preferably greater than 100° C.;

5) at a residence time of 120 minutes or less, preferably 60 minutes or less;

6) wherein the ratio of the first catalyst to the second catalyst is from 1:1 to 50:1, preferably 1:1 to 30:1;

7) wherein the activity of the catalyst components is at least 50 kilograms of polymer per gram of the catalyst components; and wherein at least 50% of the olefins are converted to polymer;

8) withdrawing olefin polymer solution from the reaction zone;

9) removing at least 10% solvent from the olefin polymer solution;

10) quenching the reaction;

11) forming molten olefin polymer where the polymer comprises one or more C3 to C40 olefins, and less than 5 mole % of ethylene, and where the polymer has:

a) a Dot T-Peel of 1 Newton or more;

b) a branching index (g') of 0.95 or less measured at the Mz of the polymer; and c) a Mw of 100,000 or less;

12) combining at least a portion of the molten olefin polymer with an functional group in the presence of a radical initiator at a temperature and for a period of time sufficient to produce the functionalized olefin polymer;

13) combining the molten functionalized olefin polymer, the olefin polymer, and one or more additives in a mixer, such as a static mixer and mixing to produce a composition;

14) removing the composition from the mixer; and 15) pelletizing or drumming the composition.

In a particularly preferred embodiment, this invention relates to a continuous process to make an adhesive comprising 1) selecting a first catalyst component capable of producing a polymer having an Mw of 100,000 or less and a crystallinity of 20% or less, (preferably 5% or less) under selected polymerization conditions;

2) selecting a second catalyst component capable of producing polymer having an Mw of 100,000 or less and a crystallinity of 20% or more (preferably 40% or more) at the selected polymerization conditions;

3) contacting, in a solvent and in a reaction zone under the selected polymerization conditions, the catalyst components in the presence of one or more activators with one or more C3 to C40 olefins, and, optionally one or more diolefins;

4) at a temperature of greater than 70° C., preferably greater than 100° C.;

5) at a residence time of 120 minutes or less, preferably 60 minutes of less;

6) wherein the ratio of the first catalyst to the second catalyst is from 1:1 to 50:1, preferably from 1:1 to 30:1;

7) wherein the activity of the catalyst components is at least 50 kilograms of polymer per gram of the catalyst components; and wherein at least 50% of the olefins are converted to polymer;

8) withdrawing olefin polymer solution from the reaction zone;

9) removing at least 10% solvent from the olefin polymer solution;

10) quenching the reaction;

11) forming molten olefin polymer where the olefin polymer comprises at least 50 mole % of one or more C3 to C40 olefins (preferably propylene), and less than 5 mole % of ethylene, and where the polymer has:

a) a Dot T-Peel of 3 Newton or more; and b) a branching index (g') of 0.90 or less measured at the Mz of the polymer; and c) an Mw of 30,000 or less;

d) a peak melting point between 60 and 190° C., e) a Heat of fusion of 1 to 70 J/g, f) a melt viscosity of 8000 mPa·sec or less at 190° C.;

12) combining at least a portion of the molten olefin polymer with an functional group in the presence of a radical initiator for a period of time sufficient to produce the functionalized olefin polymer;

13) combining the molten functionalized olefin polymer, the olefin polymer, and one or more additives in a mixer, such as a static mixer and mixing to produce the inventive composition;

14) removing the inventive olefin polymer combination from the mixer; and 15) pelletizing or drumming the inventive olefin polymer combination.

Blending of Functionalized Olefin Polymers

The F-PAO may be mixed or blended with (i.e., in combination with, an admixture of, and the like) one or more other polymer. Preferred polymers include olefin homopolymers or copolymer containing no graft component, a different graft component, or a similar graft component at a different level of inclusion, and/or the like, to achieve a final composition with a desired level of adhesion for a particular end use or process.

In an embodiment, the olefin homopolymer or copolymer to be bleded with the F-POA may also be an alpha-olefin homopolymer or copolymer containing no graft component. If desired, the alpha-olefin homopolymers may have various molecular weight characteristics, may be random and/or block copolymers of alpha-olefins themselves. Examples of the alpha-olefin include ethylene and alpha-olefins having 4 to 20 carbon atoms in addition to propylene. The homopolymers and copolymers of these alpha-olefins can be manufactured by various known methods, and may be commercially available under various trade names.

In a preferred embodiment the F-POA is combined with one or more other polymers, including but not limited to, thermoplastic polymer(s) and/or elastomer(s).

By thermoplastic polymer(s)" is meant a polymer that can be melted by heat and then cooled with out appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic C2 to C40 olefins, preferably polymers comprising propylene copolymerized with one or more C3 to C40 olefins, preferably a C3 to C20 alpha olefin, more preferably C3 to C10 alpha-olefins. More preferred polyolefins include, but are not limited to, polymers comprising ethylene including but not limited to ethylene copolymerized with a C3 to C40 olefin, preferably a C3 to C20 alpha olefin, more preferably propylene and or butene.

By elastomers is meant all natural and synthetic rubbers, including those defined in ASTM D1566). Examples of preferred elastomers include, but are not limited to, ethylene propylene rubber, ethylene propylene diene monomer rubber, styrenic block copolymer rubbers (including SI, SIS, SB, SBS, SIBS and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the F-POA is combined with one or more of isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene.

In a preferred embodiment the F-POA is combined with metallocene polyethylenes (mPE's) or metallocene polypropylenes (mPP's). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from Exxon Chemical Company in Baytown, Tex. under the tradenames EXCEED™, ACHIEVE™ and EXACT™. For more information on the methods and catalysts/activators to produce such homopolymers and copolymers see WO 94/26816; WO 94/03506; EPA 277,003; EPA 277,004; U.S. Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. Nos. 5,096,867; 5,507,475; EPA 426 637; EPA 573 403; EPA 520 732; EPA 495 375; EPA 500 944; EPA 570 982; WO91/09882; WO94/03506 and U.S. Pat. No. 5,055,438.

In a preferred embodiment the F-POA is present in the in the above blends, at from 10 to 99 weight %, based upon the weight of the polymers in the blend, preferably 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %.

In the process utilized for producing the F-POA no particular restriction need be put on a mixing manner, accordingly, the raw materials may be mixed uniformly by means of a Henschel mixer or the like and then may be melted, mixed and molded into pellets by an extruder or the like. The blends described herein may be formed using conventional techniques known in the art such that blending may be accomplished using one or more static mixers, in-line mixers, elbows, orifices, baffles, or any combination thereof. It is also possible to utilize a Brabender mixer by which mixing and melting are carried out simultaneously, and after the melting, the material can be directly molded into films, sheets, or the like.

In a preferred embodiment, the weight to weight ratio of POA to F-POA (preferably POA-g-MA), is in the range of about 1:1000 to 1000:1. In another preferred embodiment the weight to weight ratio of F-POA (preferably POA-g-MA) to POA, is preferably 1:100 or less, about 1:50 or less, about 1:20 or less, about 1:10 or less, about 1:5 or less, about 1:4 or less, about 1:3 or less, about 1:2 or less, or about 1:1. In another embodiment the weight to weight ratio of the F-POA to the POA may be about 100:1, about 50:1, about 20:1, about 10:1, about 5:1, about 4:1, about 3:1, or about 2:1.

The composition comprising the F-POA, blends of F-POA's and/or an admixture of POA and F-POA, as produced herein, may be used directly as an adhesive, or may be blended, mixed and/or combined with other components to form an adhesive formulation.

Tackifiers may be used with the compositions of the present invention. Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier may be hydrogenated.

In other embodiments, the tackifier may be non-polar. (Non-polar meaning that the tackifier is substantially free of monomers having polar groups. Preferably, the polar groups are not present, however if they are present, they are preferably not present at more that 5 weight %, preferably not more that 2 weight %, even more preferably no more than 0.5 weight %.) In some embodiments the tackifier may have a softening point (Ring and Ball, as measured by ASTM E-28) of 80° C. to 150° C., preferably 100° C. to 130° C. In another embodiment the resins is liquid and has a R and B softening point of between 10 and 70° C.

The tackifier, if present in the composition, may comprise about 0.1 to about 80 wt %, based upon the weight of the composition, more preferably 2 to 40 weight %, even more preferably 3 to 30 weight %.

Preferred hydrocarbon resins for use as tackifiers or modifiers include:
1. Resins such as C$_5$/C$_6$ terpene resins, styrene terpenes, alpha-methyl styrene terpene resins, C$_9$ terpene resins, aromatic modified C$_5$/C$_6$, aromatic modified cyclic resins, aromatic modified dicyclopentadiene based resins or mixtures thereof. Additional preferred resins include those described in WO 91/07472, U.S. Pat. No. 5,571,867, U.S. Pat. No. 5,171,793 and U.S. Pat. No. 4,078,132. Typically these resins are obtained from the cationic polymerization of compositions containing one or more of the following monomers: C$_5$ diolefins (such as 1-3 pentadiene, isoprene, and the like); C$_5$ olefins (such as 2-methylbutenes, cyclopentene, and the like); C$_6$ olefins (such as hexene), C$_9$ vinylaromatics (such as styrene, alpha methyl styrene, vinyltoluene, indene, methyl indene, and the like); cyclics (such as dicyclopentadiene, methyldicyclopentadiene, and the like); and or terpenes (such as limonene, carene, thujone, and the like).
2. Resins obtained by the thermal polymerization of dicyclopentadiene, and/or the thermal polymerization of dimers or oligomers of cyclopentadiene and/or methyl-cyclopentadiene, optionally with vinylaromatics (such as styrene, alpha-methyl styrene, vinyl toluene, indene, methyl indene, and the like).

The resins obtained after polymerization and separation of unreacted materials, can be hydrogenated if desired. Examples of preferred resins include those described in U.S. Pat. No. 4,078,132; WO 91/07472; U.S. Pat. No. 4,994,516; EP 0 046 344 A; EP 0 082 726 A; and U.S. Pat. No. 5,171,793.

Crosslinking Agents

In another embodiment the composition of this invention may further comprises a crosslinking agent. Preferred crosslinking agents include those having functional groups that can react with the acid or anhydride group. Preferred crosslinking agents include alcohols, multiols, amines, diamines and/or triamines Particular examples of crosslinking agents useful in this invention include polyamines such as ethylenediamine, diethylenetriamine, hexamethylenediamine, diethylaminopropylamine, and/or menthanediamine.

Of the F-POA's of the present invention, a copolymer in which an hydrolyzable unsaturated silane is grafted can be utilized as a starting material for a crosslinked polypropylene or a crosslinked propylene copolymer. In this case, the hydrolyzable unsaturated silane units may be present in the functionalized olefin polymer preferably in an amount of from 0.1 to 50% by weight, more preferably from 0.1 to 10% by weight based on the olefin polymer.

The composition may then be heated in the presence of water. In order to effectively form the crosslinking with the aid of water, a catalyst may also be added. Examples of suitable catalysts include hydroxides and/or oxides of alkaline metals and alkaline earth metals, ammonia, amines, organic and inorganic acids, salts thereof, alkoxysilicons, and silicon hydrides. In some cases, the catalysts may be used directly without any additional treatment. The amount of the catalyst is usually from 0.001 to 1 wt %, based on the weight of the functionalized olefin polymer. A temperature at which the above-mentioned composition may be heated in the presence of water is from about 50° C. to 200° C., preferably from 80° C. to 120° C. Water may be in the form of steam, or the composition may be immersed into boiling water.

In the thus crosslinked olefin polymer, the ratio of the boiling xylene-insoluble component to this olefin polymer is preferably from 5 to 100% by weight.

In another embodiment, the composition comprising a F-POA on which hydrolyzable unsaturated silane is grafted can be blended with a phenolic antioxidant, a sulfide hydroperoxide decomposer and a polyvalent amine to prepare a water-crosslinkable composition.

Many kinds of phenolic antioxidants are known and commercially available. A preferred example of a phenolic antioxidant is a substituted phenol such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])]propionate and pentaerythrityl-tetrakis-[3-(3,5-di-t-butyl-4-hydroxyphenyl)]propionate.

A preferable example of the sulfide hydroperoxide decomposer is an ester of a thioether, and typical examples of the commercially available sulfide hydroperoxide decomposer include diesters of 3,3'-thiodipropionic acid and higher alcohols such as lauryl alcohol, tridecyl alcohol and stearyl alcohol.

Examples of the polyvalent amine include melamine, its derivatives, a hydrazide compound such as oxalic acid-bis (benzylidenehydrazide) and a triazole compound such as 3-(N-salicyloyl)amino-1,2,4-triazole.

The amount of each of these additives to be added is such that the weight ratio of the additive to the F-POA is preferably 1/1000 to 1/100000, more preferably 1/500 to 1/10000.

No particular restriction is put on the mixing manner of the functionalized olefin polymer and the stabilizer, which may be dry mixed utilizing, for example, a Henschel mixer, followed by melting and/or granulation.

In another embodiment, phosphite additives are substantially absent from the blends of this invention. Preferably the phosphites are present at less than 1000 ppm, preferably less than 500 ppm, more preferably less than 100 ppm.

To the above-mentioned composition, there can be added a neutralizing agent such as calcium stearate, magnesium hydroxide, aluminum hydroxide or hydrotalcite, and a nucleating agent such as a salt of benzoic acid, sodium-2,2'-methylene-bis(4,6-di-t-butylphenyl) phosphate and benzyl sorbitol, and the like, in addition to the above-mentioned stabilizer.

Additives

In another embodiment, a composition comprising the polymer product of this invention may further comprise typical additives known in the art such as fillers, antioxidants, adjuvants, adhesion promoters, oils, and/or plasticizers. Preferred fillers include titanium dioxide, calcium carbonate, barium sulfate, silica, silicon dioxide, carbon black, sand, glass beads, mineral aggregates, talc, clay and the like. Preferred antioxidants include phenolic antioxidants, such as Irganox 1010, Irganox, 1076 both available from Ciba-Geigy. Preferred oils include paraffinic or napthenic oils such as Primol 352, or Primol 876 available from ExxonMobil Chemical France, S.A. in Paris, France. Preferred plasticizers include polybutenes, such as Parapol 950 and Parapol 1300 formerly available from ExxonMobil Chemical Company in Houston Tex. Other preferred additives include block, anti-block, pigments, processing aids, UV stabilizers, hindered amine light stabilizers, UV absorbers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads. Preferred adhesion promoters include polar acids, polyaminoamides (such as Versamid 115, 125, 140, available from Henkel), urethanes (such as isocyanate/hydroxy terminated polyester systems, e.g. bonding agent TN/Mondur Cb-75 (Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins.

In another embodiment the composition may include less than 3 wt % anti-oxidant, less than 3 wt % flow improver, less than 10 wt % wax, and or less than 3 wt % crystallization aid.

Other optional components that may be combined with the adhesive composition as disclosed herein include plasticizers, and/or other additives such as oils, surfactants, fillers, color masterbatches, and the like. Preferred plasticizers include mineral oils, polybutenes, phthalates and the like. Particularly preferred plasticizers include phthalates such as di-iso-undecyl phthalate (DIUP), di-iso-nonylphthalate (DINP), dioctylphthalates (DOP) and/or the like. Particularly preferred oils include aliphatic naphthenic oils.

Other optional components that may be combined with the polymer product of this invention are low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers. Preferred waxes include ESCOMER™ 101. Preferred functionalized waxes include those modified with an alcohol, an acid, a ketone, an anhydride and the like. Preferred examples include waxes modified by methyl ketone, maleic anhydride or maleic acid. Preferred oils include aliphatic napthenic oils, white oils, or the like. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of 950 and a kinematic viscosity of 220 cSt at 100° C., as measured by ASTM D 445. In some embodiments the polar and non-polar waxes are used together in the same composition.

In some embodiments, however, wax may not be desired and may thus be present at less than 10 weight %, preferably less than 5 weight %, more preferably less than 1 weight %, more preferably less than 0.5 weight %, based upon the weight of the composition.

In another embodiment the composition of this invention may have less than 30 weight % total of any combination of additives described above, preferably less than 25 weight %, preferably less than 20 weight %, preferably less than 15 weight %, preferably less than 10 weight %, preferably less than 5 weight %, based upon the total weight of F-POA, POA and other polymers present.

The composition of this invention or formulations thereof may then be applied directly to a substrate or may be sprayed thereon. The composition may be molten, or heated to a semisolid state prior or during application. Spraying is defined to include atomizing, such as producing an even dot pattern, spiral spraying such as Nordson Controlled Fiberization or oscillating a stretched filament like may be done in the ITW Dynafiber/Omega heads or Summit technology from Nordson. The compositions described herein may be applied using melt blown techniques as well. Melt blown techniques are defined to include the methods described in U.S. Pat. No. 5,145,689 or any process where air streams are used to break up filaments of the extrudate and then used to deposit the broken filaments on a substrate. In general, melt blown techniques are processes that use air to spin hot melt adhesive fibers and convey them onto a substrate for bonding. Fibers sizes can easily be controlled from 20-200 microns by changing the melt to air ratio. Few, preferably no, stray fibers are generated due to the inherent stability of adhesive melt blown applicators. Under UV light the bonding appears as a regular, smooth, stretched dot pattern. Atomization is a process that uses air to atomize hot melt adhesive into very small dots and convey them onto a substrate for bonding.

Heat Stability

The compositions of the present invention preferably are heat stable, by which is meant that the Gardner color (as measured by ASTM D-1544-68) of the composition that has been heated to 180° C. for 48 hours, does not change by more than 7 Gardner units when compared to the Gardner color of the initial composition. Preferably, the Gardner color of the composition after heating to 180° C. for 48 hours does not change by more than 6, more preferably 5, still more preferably 4, still more preferably 3, still more preferably 2, still more preferably 1 Gardner color unit, as compared to the initial composition prior to being heated.

In a preferred embodiment, the F-POA is heat stable, by which is meant that the Gardner color (as measured by ASTM D-1544-68) of the F-POA that has been heated to 180° C. for 48 hours, does not change by more than 7 Gardner units when compared to the Gardner color of the initial F-POA. Preferably, the Gardner color of the F-POA after heating to 180° C. for 48 hours does not change by more than 6, more preferably 5, still more preferably 4, still more preferably 3, still more preferably 2, still more preferably 1 Gardner color unit, as compared to the initial F-POA prior to being heated.

It has been discovered that free acid groups present in the composition may result in reduced heat stability. Accordingly, in a preferred embodiment, the amount of free acid groups present in the F-POA is less than about 1000 ppm, more preferably less than about 500 ppm, still more preferably less than about 100 ppm, based on the total amount of F-POA present.

In an embodiment, the composition may comprise F-POA in which at least a portion has been washed with an organic solvent, with an aqueous solution, with an acidic solution, with a basic solution, or a combination thereof, prior to incorporation of the F-POA into the final composition. Likewise, the entire composition may also be washed once formed.

In a preferred embodiment, the acid value of the F-POA, after washing with an aqueous solution, differs from the acid value of the F-POA prior to washing by less than about 10%, preferably by less than about 5%, more preferably by less than about 1% as determined by ASTM D-94-02

In a preferred embodiment, the F-POA comprises maleic anhydride, and the acid value of the F-POA, after washing with an aqueous solution, may differ from the acid value of the F-POA prior to washing by less than about 10%, preferably by less than about 5%, more preferably by less than about 1% as determined by ASTM D 94-02.

In another embodiment, the F-POA comprises an unsaturated group comprising a carbonyl group (preferably maleic anhydride), and peaks measured in the infrared spectrum of the composition attributable to free acid content (e.g., —OH stretch, C=O stretch, and the like) are reduced in peak height by less than about 20%, preferably less than about 10%, more preferably less than about 5%, still more preferably less than about 1%, as compared to the same peaks in an infra red spectrum of the composition measured essentially the same way after the composition has been devolatilized by heating at 180° C. for 30 minutes.

Lamination Melt Coating

The compositions of this invention may be used in any adhesive application, including but not limited to, disposables, packaging, laminates, pressure sensitive adhesives, tapes labels, wood binding, paper binding, non-wovens, road marking, reflective coatings, and the like.

In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

One or more of the embodiments of the compositions described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spun bonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends.

Any of the above substrates, and/or the polymers of this invention, may be corona discharge treated, flame treated, electron beam irradiated, gamma irradiated, microwaved, or silanized.

The adhesives produced herein, when coated in some fashion between two adherends, preferably perform such that the materials are held together in a sufficient fashion compared to a standard specification or a standard adhesive similarly constructed. In so doing, the inventive composition may be utilized as a surface primer, as a tie layer, as an adhesion promoter, as a hot melt adhesive, as a compatiblizer, or the like.

The compositions of this invention may be used in any adhesive application described in WO 97/33921 in combination with the polymers described therein or in place of the polymers described therein.

The compositions of this invention, alone or in combination with other polymers and or additives, may also be used to form hook and loop fasteners as described in WO 02/35956.

In a particularly preferred embodiment the compositions of this invention are used as adhesives in low temperature (less than 0° C.) applications.

In a particularly preferred embodiment the compositions of this invention are used as adhesives in high temperature (more than 40° C.) applications.

In a particularly preferred embodiment the compositions of this invention are used as adhesives in applications requiring both high and low temperature performance (such as freezer to microwave applications or cardboard storage boxes for use in non-climate controlled wharehouses).

In a preferred embodiment this invention relates to:
1. A composition comprising a C3 to C40 olefin polymer olefin polymer comprising at least 50 mol % of one or more C3 to C40 olefins, and where the olefin polymer has:
   a) a Dot T-Peel of 1 Newton or more on Kraft paper;
   b) an Mw of 10,000 to 100,000; and
   c) a branching index (g') of 0.98 or less measured at the Mz of the polymer when the polymer has an Mw of 10,000 to 60,000, or
   a branching index (g') of 0.95 or less measured at the Mz of the polymer when the polymer has an Mw of 10,000 to 100,000; and where the C3 to C40 olefin polymer comprises at least 0.001 weight % of an functional group.
2. The composition of paragraph 1, wherein the C3 to C40 olefin polymer, prior to functionalization, has:
   a) a Dot T-Peel of 1 Newton or more on Kraft paper;
   b) a branching index (g') of 0.98 or less measured at the Mz of the polymer;
   c) a Mw of 10,000 to 60,000; and
   d) a heat of fusion of 1 to 50 J/g.
3. The composition of paragraph 1 or 2, where the C3 to C40 olefin polymer, prior to functionalization, is a homopolypropylene or a copolymer of propylene and up to 5 mole % ethylene having:
   a) an isotactic run length of 1 to 30,
   b) a percent of r dyad of greater than 20%, and
   c) a heat of fusion of between 1 and 70 J/g.
4. The composition of any of paragraphs 1-3, wherein the C3 to C40 olefin polymer, prior to functionalization, comprises propylene and less than 15 mole % of ethylene.
5. The composition of any of paragraphs 1-4, wherein the C3 to C40 olefin polymer, prior to functionalization, has a melt viscosity of 7000 mPa·sec or less at 190° C.
6. The composition of any of paragraphs 1-5, wherein the C3 to C40 olefin polymer, prior to functionalization, has a melt viscosity of 5000 mPa·sec or less at 190° C.
7. The composition of any of paragraphs 1-6, wherein the C3 to C40 olefin polymer, prior to functionalization, has a melt viscosity of between 250 and 6000 mPa·sec at 190° C.
8. The composition of any of paragraphs 1-7, wherein the C3 to C40 olefin polymer, prior to functionalization, has a melt viscosity of between 500 and 3000 mPa·sec at 190° C.
9. The composition of any of paragraphs 1-8, wherein the C3 to C40 olefin polymer, prior to functionalization, has a Tg of 0° C. or less.
10. The composition of any of paragraphs 1-9, wherein the C3 to C40 olefin polymer, prior to functionalization, has a Tg of −10° C. or less.
11. The composition of any of paragraphs 1-10, wherein the C3 to C40 olefin polymer, prior to functionalization, has an Mw of 10,000 to 75,000 and a branching index of 0.6 or less.
12. The composition of any of paragraphs 1-11, wherein the C3 to C40 olefin polymer, prior to functionalization, has an Mw of 10,000 to 50,000 and a branching index of 0.7 or less.
13. The composition of any of paragraphs 1-12, wherein the C3 to C40 olefin polymer, prior to functionalization, has an Mw of 10,000 to 30,000 and a branching index of 0.98 or less.
14. The composition of any of paragraphs 1-13, wherein the C3 to C40 olefin polymer, prior to functionalization, has a branching index (g') of 0.90 or less measured at the Mz of the polymer.
15. The composition of any of paragraphs 1-14, wherein the SEC graph of the C3 to C40 olefin polymer, prior to functionalization, is bi- or multi-modal.
16. The composition of any of paragraphs 1-15, wherein the C3 to C40 olefin polymer, prior to functionalization, has an amorphous content of at least 50%.
17. The composition of any of paragraphs 1-16, wherein the C3 to C40 olefin polymer, prior to functionalization, has
   a) a peak melting point between 60 and 190° C.;
   b) a heat of fusion of 0 to 70 J/g; and
   c) a melt viscosity of 8000 mPa·sec or less at 190° C.
18. The composition of any of paragraphs 1-17, wherein the C3 to C40 olefin polymer, prior to functionalization, has:
   a) a Tg of −10° C. or less;
   b) a melt viscosity between 2000 and 6000 mPa·sec;
   c) a molecular weight distribution (Mw/Mn) of at least 5; and
   d) a bi- or multi-modal SEC graph of the polymer.
19. The composition of any of paragraphs 1-18, wherein the C3 to C40 olefin polymer, prior to functionalization, has a crystallinity of at least 5%.
20. The composition of any of paragraphs 1-19, wherein the C3 to C40 olefin polymer, prior to functionalization, has 20 wt. % or more of hexane room temperature soluble fraction and 50 wt % or less of Soxhlet heptane insolubles.

21. The composition of any of paragraphs 1-20, wherein the C3 to C40 olefin polymer, prior to functionalization, comprises less than 3.0 mole % ethylene.
22. The composition of any of paragraphs 1-21, wherein the C3 to C40 olefin polymer, prior to functionalization, comprises less than 1.0 mole % ethylene.
23. A composition comprising the composition of any of paragraphs 1-22 and a functionalized wax.
24. A composition comprising the composition of any of paragraphs 1-23 and a wax.
25. A composition comprising the composition of any of paragraphs 1-24 and a hydrocarbon resin.
26. The composition of any of paragraphs 1-25 wherein the functional group is present at 0.005 to 50 weight % of the C3 to C40 olefin polymer.
27. The composition of any of paragraphs 1-26 wherein the functional group is present at 1 to 20 weight % of the C3 to C40 olefin polymer.
28. The composition of any of paragraphs 1-27 wherein the unsaturated group comprises maleic acid and or maleic anhydride.
29. The composition of any of paragraphs 1-28, wherein the C3 to C40 olefin polymer, prior to functionalization, has an Mz/Mn of 2 to 200.
30. The composition of any of paragraphs 1-29, wherein the C3 to C40 olefin polymer, prior to functionalization, has an Mz of 15,000 to 500,000.
31. The composition of any of paragraphs 1-30 wherein the composition has a SAFT of 50 to 150° C.
32. The composition of any of paragraphs 1-31, wherein the composition has a Shore A hardness of 95 or less.
33. The composition of any of paragraphs 1-32, wherein the composition has a set time of 5 seconds or less.
34. The composition of any of paragraphs 1-33, wherein the C3 to C40 olefin polymer, prior to functionalization, has an Mw/Mn of 2 to 75.
35. The composition of any of paragraphs 1-34, wherein the C3 to C40 olefin polymer is functionalized with an unsaturated carboxylic acid, an ester of an unsaturated carboxylic acid, an acid anhydride, a di-ester, a salt of an unsaturated carboxylic acid, an unsaturated amide, an unsaturated imide, an aromatic vinyl compound, a hydrolyzable unsaturated silane compound, an unsaturated halogenated hydrocarbon, or a combination thereof.
36. The composition of any of paragraphs 1-35, wherein the C3 to C40 olefin polymer is functionalized with one or more of maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&g, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, x-methyl-bicyclo(2.2.1)hept-5-ene-2,3-dicarboxylic acid anhydride (XMNA), methyl acrylate, ethyl acrylate, butyl acrylate, methyl methacrylate, ethyl methacrylate, butyl methacrylate, vinyltrichlorosilane, vinyltris(beta-methoxyethoxy)silane, vinyltriethoxysilane, vinyltrimethoxysilane, gamma-methacryloxypropyltrimethoxysilane monovinylsilane, monoallylsilane, vinyl chloride, or vinylidene chloride.
37. The composition of any of paragraphs 1-36, wherein the functional group is maleic anhydride.
38. The composition of any of paragraphs 1-37, wherein the composition further comprises another polymer.
39. The composition of paragraph 38, wherein the polymer comprises an olefin homopolymer or copolymer that is not functionalized.
40. The composition of paragraph 38 or 39, wherein the polymer comprises an olefin homopolymer or copolymer that comprises a different functional group or groups.
41. The composition of any of paragraphs 38-40, wherein the polymer comprises a functionalized C3 to C40 olefin polymer that comprises a different amount of the same functionalized group.
42. The composition of any of paragraphs 38-41, wherein the polymer comprises an alpha-olefin homopolymer comprising ethylene, C4 to C20 alpha olefins, or a combination thereof
43. The composition of any of paragraphs 38-42, wherein the polymer is selected from the group consisting of ethylene propylene rubber, ethylene propylene diene monomer rubber, styrenic block copolymer rubber, butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber or a combination thereof
44. The composition of any of paragraphs 38-43, wherein the polymer is selected from the group consisting of isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm³) linear low density polyethylene, ultra low density polyethylene (density 0.86 to less than 0.90 g/cm³), very low density polyethylene (density 0.90 to less than 0.915 g/cm³), medium density polyethylene (density 0.935 to less than 0.945 g/cm³), high density polyethylene (density 0.945 to 0.98 g/cm³), ethylene vinyl acetate, ethylene methyl acrylate, copolymers of acrylic acid, polymethylmethacrylate, polyvinylchloride, polybutene-1, isotactic polybutene, ABS resins, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols andor polyisobutylene.
45. The composition of any of paragraphs 38-44, wherein the polymer is selected from the group consisting of metallocene polyethylenes or metallocene polypropylenes.
46. The composition of any of paragraphs 1-45 wherein the composition further comprises a non-functionalized C3 to C40 olefin polymer comprising at least 50 mol % of one or more C3 to C40 olefins, and where the olefin polymer has:
 a) a Dot T-Peel of 1 Newton or more on Kraft paper;
 b) an Mw of 10,000 to 100,000; and
 c) a branching index (g') of 0.98 or less measured at the Mz of the polymer when the polymer has an Mw of 10,000 to 60,000, or
 a branching index (g') of 0.95 or less measured at the Mz of the polymer when the polymer has an Mw of 10,000 to 100,000.

47. The composition of paragraph 46, wherein the non-functionalized C3 to C40 olefin polymer has:
   a) a Dot T-Peel of 1 Newton or more on Kraft paper;
   b) a branching index (g') of 0.98 or less measured at the Mz of the polymer;
   c) a Mw of 10,000 to 60,000; and
   d) a heat of fusion of 1 to 50 J/g.
48. The composition of paragraph 46, where the non-functionalized C3 to C40 olefin polymer is a homopolypropylene or a copolymer of propylene and up to 5 mole % ethylene having:
   a) an isotactic run length of 1 to 30,
   b) a percent of r dyad of greater than 20%, and
   c) a heat of fusion of between 1 and 70 J/g.
49. The composition of any of paragraphs 46-48, wherein the non-functionalized C3 to C40 olefin polymer has a melt viscosity of 5000 mPa·sec or less at 190° C.
50. The composition of any of paragraphs 46-49, wherein the non-functionalized C3 to C40 olefin polymer has an amorphous content of at least 50%.
51. The composition of any of paragraphs 46-50, wherein the non-functionalized C3 to C40 olefin polymer has a crystallinity of at least 5%.
52. The composition of any of paragraphs 1-51, further comprising about 0.1 to about 50 wt % of a tackifier, a filler, an antioxidant, an adjuvant, an adhesion promoter, an oil, a plasticizer, a block, an antiblock, a pigment, a processing aid, a UV stabilizer, a neutralizer, a lubricant, a surfactant, a nucleating a coupling agent, a color master batch, a polymer having a Mn below 5000, a polar wax, a non-polar wax, a functionalized wax, a polypropylene wax, a polyethylene wax, a wax modifier, an elastomer, an impact copolymer, an ester polymer, a crosslinking agent, or a combination thereof
53. The composition of any of paragraphs 1-52, wherein the Gardner color of the composition that has been heat aged at 180° C. for 48 hours does not change by more than 7 Gardner units as compared to the Gardner color of the composition prior to being heat aged.
54. The composition of any of paragraphs 1-53, wherein the Gardner color of the composition that has been heat aged at 180° C. for 48 hours does not change by more than 4 Gardner units as compared to the Gardner color of the composition prior to being heat aged.
55. The composition of any of paragraphs 1-54, wherein the amount of free acid groups present in component 2 is less than about 1000 parts per million, based on the total amount of functionalized C3 to C40 olefin polymer present.
56. The composition of any of paragraphs 1-55, which is essentially free from phosphites.
57. The composition of any of paragraphs 1-56, the C3 to C40 olefin polymer comprising at least 0.001 to 50 weight % functional group has been washed with an organic solvent, with an aqueous solution, with an acidic solution, with a basic solution, or a combination thereof
58. The composition of any of paragraphs 1-57, wherein the functional group comprises maleic anhydride and the at least a portion of the polymer has been washed with a basic solution.
59. The composition of paragraph 58, wherein an acid value of the polymer, after washing with the basic solution differs from the acid value of the polymer prior to the washing by less than about 10%.
60. The composition of paragraph 58 or 59, wherein one or more peaks measured in an infrared spectrum of the composition attributable to free acid content are reduced in peak height by less than about 20% compared to the same peaks in an infra red spectrum of the composition measured essentially the same way after the composition has been devolatilized by heating at 180° C. for 30 minutes.
61. A process of making the composition of any of paragraphs 1-60, comprising the steps of:
   1) combining monomer, optional solvent, catalyst and activator in a reactor system;
   2) withdrawing olefin polymer solution from the reactor system,
      where the polymer comprises at least 50 mol % of one or more C3 to C40 olefins and has:
      a) a Dot T-Peel of 1 Newton or more on Kraft paper;
      b) an Mw of 10,000 to 100,000; and
      c) a branching index (g') of 0.98 or less measured at the Mz of the polymer when the polymer has an Mw of 10,000 to 60,000, or
      a branching index (g') of 0.95 or less measured at the Mz of the polymer when the polymer has an Mw of 10,000 to 100,000;
   3) removing at least 10% solvent, if present, from the olefin polymer solution;
   4) quenching the reaction;
   5) devolatilizing the olefin polymer solution to form molten olefin polymer;
   6) combining at least a portion of the molten olefin polymer with an functional group in the presence of a radical initiator at a temperature, and for a period of time sufficient to produce molten functionalized olefin polymer;
   7) combining the molten functionalized polymer, the olefin polymer, and optionally one or more additives in a mixer and mixing to produce a composition;
   8) removing the composition from the mixer, and
   9) pelletizing or drumming the composition.
62. A surface primer comprising the composition of any of paragraphs 1-61.
63. A tie layer comprising the composition of any of paragraphs 1-62.
64. An adhesion promoter comprising the composition of any of paragraphs 1-63.
65. A hot melt adhesive comprising the composition of any of paragraphs 1-64.
66. A compatiblizer comprising the composition of any of paragraphs 1-65.

EXAMPLES

Analytical Testing

Molecular weights (number average molecular weight (Mn), weight average molecular weight (Mw), and z-average molecular weight (Mz)) were determined using a Waters 150 Size Exclusion Chromatograph (SEC) equipped with a differential refractive index detector (DRI), an online low angle light scattering (LALLS) detector and a viscometer (VIS). The details of the detector calibrations have been described elsewhere [See T. Sun, P. Brant, R. R. Chance, and W. W. Graessley, *Macromolecules*, Volume 34, Number 19, 6812-6820, (2001)].

The SEC with three Polymer Laboratories PLgel 10 mm Mixed-B columns, a nominal flow rate 0.5 cm³/min, and a nominal injection volume 300 microliters was common to both detector configurations. The various transfer lines, columns and differential refractometer (the DRI detector, used mainly to determine eluting solution concentrations) were contained in an oven maintained at 135° C.

The LALLS detector used was a model 2040 dual-angle light scattering photometer (Precision Detector Inc.). Its flow cell, located in the SEC oven, uses a 690 nm diode laser light source and collects scattered light at 15° and 90°. The 15° output was used herein. The signal generated was sent to a data acquisition board (National Instruments) that accumulates readings at a rate of 16 per second. The lowest four readings were averaged, and the proportional signal was sent to the SEC-LALLS-VIS computer. The LALLS detector was placed after the SEC columns, and before the viscometer.

The viscometer was a high temperature Model 150R (Viscotek Corporation) having four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer was calculated from these outputs. The viscometer was inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/ 0.22 micron Teflon filter assembly between the high pressure pump and SEC columns. The TCB was then degassed with an online degasser (Phenomenex, Model DG-4000) before entering the SEC.

Sample solutions were prepared by placing the dry polymer sample in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The branching index was measured using SEC with an on-line viscometer (SEC-VIS) and are reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison were of the same viscosity average molecular weight, monomer content and composition distribution. Linear character for polymer containing C2 to C10 monomers is confirmed by Carbon-13 NMR according to Randall (Rev. Macromol. Chem. Phys., C29 (2&3), p. 285-297). Linear character for C11 and above monomers was confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard was desired for a polymer where the comonomer is C9 or more, protocols described by T. Sun, P. Brant, R. R. Chance, and W. W. Graessley, *Macromolecules*, Volume 34, Number 19, 6812-6820, (2001) were used in determining standards. In the case of syndiotactic polymers, the standard was selected to have a comparable amount of syndiotacticity as measured by Carbon 13 NMR.

Peak melting point (Tm), peak crystallization temperature (Tc), heat of fusion and crystallinity were determined using ASTM E 794-85. Differential scanning calorimetric (DSC) data was obtained using a TA Instruments model 2920. e.g., samples weighing approximately 7-10 mg were sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the curves were measured and used to determine the heat of fusion and the degree of crystallinity. The percent crystallinity is calculated using the formula, [area under the curve (Joules/gram)/B (Joules/gram)] *100, where B is the heat of fusion for the homopolymer of the major monomer component. These values for B were obtained from the Polymer Handbook, Fourth Edition, published by John Wiley and Sons, New York 1999. A value of 189 J/g (B) was used as the heat of fusion for 100% crystalline polypropylene. For polymers displaying multiple melting or crystallization peaks, the highest melting peak was taken as peak melting point, and the highest crystallization peak was taken as peak crystallization temperature.

The glass transition temperature (Tg) was measured by ASTM E 1356 using a TA Instruments model 2920.

Melt Viscosity was determined according to ASTM D-3236, which is also referred to herein as "viscosity" and/or "Brookfield viscosity". Melt viscosity profiles were measured at a temperature from 120° C. to 190° C. using a Brookfield Thermosel viscometer and a number 27 spindle unless otherwise noted.

Adhesive Testing

The samples were prepared consistent with testing of adhesives, in particular, hot melt adhesives, by using the olefin polymers or blending the olefin polymers, functionalized olefin polymers, additives, tackifier, wax, antioxidant, and other ingredients or components under mixing at elevated temperatures to form fluid melt. The mixing temperature varied from about 130 to about 190° C. Adhesive test specimens were created by bonding the substrates together with a portion (e.g., a dot) of molten adhesive and compressing the bond with a 500-gram weight until cooled to room temperature (i.e., about 25° C.). The dot size was controlled by the adhesive volume such that in most cases the compressed disk which formed gave a uniform circle just inside the dimensions of the substrates. Once a construct has been produced, it was be subjected to various insults in order to assess the effectiveness of the bond.

Once a bond fails to a paper substrate the effectiveness of the bond was quantified by estimating the area of the adhesive dot that retained paper fibers as the construct failed along the bond line. This estimate is referred to herein as the percent substrate fiber tear. An example of good fiber, after conditioning a sample for 15 hours at −12° C. and attempting to destroy the bond, would be an estimate of 80-100% substrate fiber tear. It is likely that 0% substrate fiber tear under those conditions would signal a loss of adhesion.

Substrate fiber tear: The specimens were prepared using the same procedure as that described above. For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of failure observed. The amount of substrate fiber tear is expressed herein as a percentage.

Dot T-Peel was determined according to ASTM D 1876, except that the specimen was produced by combining two 1 inch by 3 inch (2.54 cm×7.62 cm) substrate cut outs with a dot of adhesive with a volume that, when compressed under a 500-gram weight occupied about 1 square inch of area (1 inch=2.54 cm). Once all the specimens were made, each were pulled apart in a side by side testing arrangement at a rate of 2 inches per minute by a machine that records the destructive force of the insult being applied. The maximum force achieved for each sample tested was recorded and averaged, thus producing the average maximum force which is reported as the Dot T-Peel.

Peel Strength (modified ASTM D1876): Substrates (1×3 inches (25×76 mm)) were heat sealed with adhesive film (5 mils (130 μm) thickness) at 135° C. for 1 to 2 seconds and 40 psi (0.28 MPa) pressure. Bond specimens were peeled back in a tensile tester at a constant crosshead speed of 2 in/min (51 mm/min). The average force required to peel the bond (5 specimens) apart was recorded.

Set time is defined for use herein as the time it takes for a compressed adhesive substrate construct to fasten together with enough adhesion so as to give substrate fiber tear when pulled apart, and thus the bond is sufficiently strong to remove the compression. The bond will likely still strengthen upon further cooling, however, it no longer requires compression. These set times were measured by placing a molten dot of adhesive on to a file folder substrate taped to a flat table. A file folder tab (1 inch by 3 inch (2.5 cm×7.6 cm)) was placed upon the dot 3 seconds later and compressed with a 500 gram weight. The weight was allowed to sit for about 0.5 to about 10 seconds. The construct thus formed was pulled apart to check for a bonding level sufficient to produce substrate fiber tear. The set time was recorded as the minimum time required for this bonding to occur. Standards of commercially available adhesives were used to calibrate this process.

SAFT (modified D4498) measures the ability of a bond to withstand an elevated temperature rising at 10° F. (5.5° C.)/15 min., under a constant force that pulls the bond in the shear mode. Bonds were formed in the manner described above on Kraft paper (1 inch by 3 inch (2.5 cm×7.6 cm)). The test specimens were suspended vertically in an oven at room temperature with a 500-gram load attached to the bottom. The temperatures at which the weight fell was recorded (when the occasional sample reached temperatures above the oven capacity>265° F. (129° C.) it was terminated and averaged in with the other samples at termination temperature).

Shore A hardness was measured according to ASTM D 2240. An air cooled dot of adhesive was subjected to the needle and the deflection was recorded from the scale.

Sample Preparation and Description

Two POA homopolypropylenes were produced according to the general procedures described in U.S. Ser. No. 10/868,951, filed Oct. 15, 2003. The catalysts used were di(p-triethylsilylphenyl) methylene(cyclopentadienyl)(3,8-di-t-butylfluorenyl)hafnium dimethyl and rac-dimethylsilyl bis(2-methyl-4-phenylindenyl)zirconium dimethyl the activator used was N,N-dimethylaniliniumtetrakis(pentafluorophenyl)borate. The polymerization was run at 131° C. in hexane.) The polymer properties are listed in Table A.

TABLE A

|  | Mn (kg/mol) | Mw (kg/mol) | Mz (kg/mol) | Viscosity 190° C., (cps) | g' @ Mz | Tc (° C.) | Tm (° C.) | Hf (J/g) |
|---|---|---|---|---|---|---|---|---|
| POA 11 | 19,600 | 41,100 | 76,000 | 1600 | 0.82 | 78 | 132 | 28.7 |
| POA 12 | 20,700 | 40,600 | 72,500 | 1522 | 0.82 | 69 | 132 | 29.5 |

Two blends of POA 12 were made. One where the POA-12 was functionalized with maleic anhydride and one without.
POA-12-g-MA POA-12 was functionalized by dissolving 120 g of POA-12 polymer in toluene (polymer concentration is about 20 wt. %) to which 15 wt. % (based on polymer) of maleic anhydride was added. 2.5 wt % of 2,5-dimethyl-2,5-di(t-butylperoxyl) hexane was added and the reaction was heated to 139° C. and allowed to react for 4 hours. The method described by M. Sclavons et al. (Polymer, 41 (2000), page 1989) was used to determine the MA content of the maleated polymer. Briefly, about 0.5 gram of polymer was dissolved in 150 ml of toluene at the boiling temperature.

A potentiometric titration with tetra-butylammonium hydroxide using bromothymol blue as the color indicator was performed on the heated solution in which the polymer did not precipitate during the titration. The POA-12-g-MA was found to contain 1.41 weight % MA. Adhesion testing was then conducted on the POA-12-, POA-11, and POA-12-g-MA blended with other components. The data are as follows:

|  | Example 1 | Example 2 | Example 3 |
|---|---|---|---|
| POA-12 (wt %) | 74.3 | 79.3 |  |
| POA-11 (wt %) |  |  | 81.6 |
| POA-12-g-MA (wt %) | 5 |  |  |
| Escorez 5690 (wt. %) | 10 | 10 | 9.0 |
| C80 Wax (wt. %) | 10 | 10 | 8.7 |
| Irganox 1010 (wt. %) | 0.7 | 0.7 | 0.7 |
| Set time (sec) | 3.5 | 3 | 3.5 |
| Shore A hardness | 81/71 | 83/63 | 84/64 |
| Percent of fiber tear on Inland paperboard @ 25° C. | 94 | 96 | 99 |
| Percent of fiber tear on Inland paperboard @ −10° C. | 43 | 0 | 0 |
| Percent of fiber tear on Inland paperboard @ −30° C. | 68 | 13 | 0 |

Escorez 5690 is a hydrogenated aromatic modified resin produced from dicyclopentadiene feedstock, exhibiting a ring and ball softening point of 130° C. available from ExxonMobil in Houston, Tex.
C80 wax is Paraflint C80 propylene wax—which is a Fischer Tropsch fractionated wax, available from Moore and Munger.

As the data clearly shows, the inventive adhesive formulation dramatically improved the adhesion at −10° C. and −30° C.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A composition comprising a functionalized C3 to C40 olefin polymer; and an additional non-functionalized polymer comprising at least 70% propylene; wherein the additional non-functionalized polymer has at least two molecular weight fractions present at greater than 20 weight % each based upon the weight of the polymer as measured by Gel Permeation Chromatography; and wherein the non-functionalized polymer has a Dot T-Peel of 1 Newton or more on Kraft paper and a Mw of 10,000 to 100,000.

2. The composition of claim 1, wherein the functionalized C3 to C40 olefin polymer is present in the composition in the range of 2 to 20 weight %.

3. The composition of claim 1, wherein the functionalized C3 to C40 olefin comprises at least 0.0001 weight % of a functional group.

4. The composition of claim 3, wherein the functional group is maleic anhydride.

5. The composition of claim 1, wherein the functionalized C3 to C40 olefin polymer has a Mw of 10,000 to 100,000.

6. The composition of claim 1, wherein the non-functionalized polymer has a heat of fusion between 20 and 50 J/g.

7. The composition of claim 1, wherein the non-functionalized polymer comprises at least 80% propylene.

8. The composition of claim 1, wherein the non-functionalized polymer comprises a branching index (g') of 0.98 or less measured at the Mz of the polymer when the polymer has a Mw of 10,000 to 60,000, or a branching index (g') of 0.95 or less measured at the Mz of the polymer when the polymer has an Mw of 10,000 to 100,000.

9. The composition of claim 1, wherein the non-functionalized C3 to C40 olefin polymer has a melt viscosity of 7000 mPa·sec or less at 190° C.

10. The composition of claim 1, wherein the non-functionalized C3 to C40 olefin polymer has a Tg of 0° C. or less.

11. The composition of claim 1, wherein the non-functionalized polymer comprises 5 mole % ethylene or less.

* * * * *